A. C. Gallahue,
Boot & Shoe Pegging Mach.
No. 3517.
Reissued June 22. 1869.
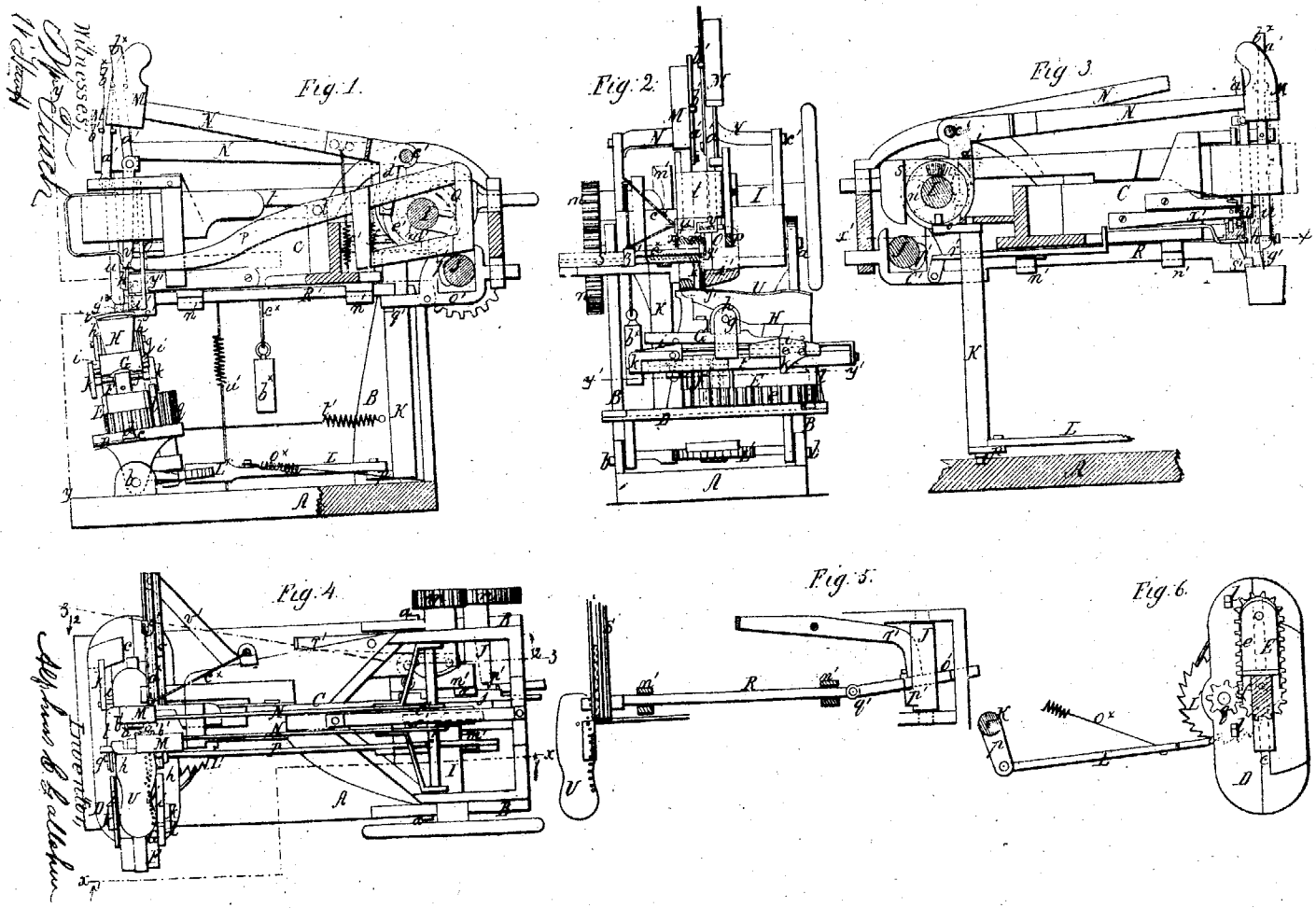
Witnesses,
Wm. Tusch
W. Tusch
Inventor,
Alphus C. Gallahue

United States Patent Office.

ALPHEUS C. GALLAHUE, OF RIVERDALE, NEW YORK.

*Letters Patent No.* 23,361, *dated March* 29, 1859; *reissue No.* 3,517, *dated June* 22, 1869.

IMPROVED MACHINE FOR PEGGING BOOTS AND SHOES.

The Schedule referred to in these Letters Patent and making part of the same.

*To all whom it may concern:*

Be it known that I, ALPHEUS C. GALLAHUE, of Riverdale, in the county of Westchester, and State of New York, have invented certain new and useful Improvements in Machines for Pegging Boots and Shoes; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1 is a side sectional view of my invention, taken in the line X X, fig. 4, and looking in the direction indicated by arrows 1.

Figure 2 is a front sectional view of the same, taken in the line Y Y, fig. 1.

Figure 3 is a side sectional view of the same, taken in the line Z Z, fig. 4, and looking in the direction indicated by arrows 2.

Figure 4, a plan or top view of the same.

Figure 5, a horizontal section of the same, taken in the line X′ X′, fig. 3.

Figure 6, a horizontal section of the same, taken in the line Y′ Y′, fig. 2.

The object of this invention is to obtain a machine that will perform the whole of the work that relates to the pegging of boots and shoes, to wit, the making of the holes in the soles, to receive the pegs, and driving of the pegs in the holes, and also the splitting of the pegs from the strip, or block, as well as the duplicating of the rows of pegs entirely around the sole, or at certain points of the sole, each at right angles to the sole, where driven.

The invention consists in the means employed for effecting the above results, whereby an automatic machine is produced, and one that will be far more perfect in its operation, than any that has hitherto passed under my observation.

A represents a base, or platform, on the back part of which two uprights, B B, are secured.

C is a frame, the back part of which is fitted between pivots *a a*, in the upper parts of the uprights B B, said frame being allowed to work, or move vertically, as occasion may require, between said points, as centres.

D is a bed-plate, which is fitted transversely on the base, A, and between centres *b b*.

This bed-plate is grooved longitudinally, as shown clearly at *c* in fig. 6, and an adjustable sliding rack-block, E, is placed on said bed-plate, the rack-block having projections *d*, at its under side, which projections fit in the groove *c*, as shown clearly in fig. 1.

The rack-block E is allowed to slide freely on the bed-plate D; and said block is formed of two parts, *e* *f*, one part, *f*, being placed directly over the other, and so arranged as to admit of being adjusted further in or out on the part *e*, and thereby regulate the length of the rack-block, the part *f* having teeth formed on its outer side, as shown clearly in fig. 2.

To the upper surface of the part *e* of the rack-block, a plate, F, is permanently attached; and G is a swinging plate, or block, which is suspended on a rod, or shaft, *g*, the ends of which are fitted in uprights *h h*, at the sides of the plate F. (See figs. 1, 2, and 4.)

Between the swinging plate, or block G, and the plate F, inclined planes *i i* are placed, said inclined planes being attached to the plates *j*, which are allowed to slide freely on the plate F These inclined planes *i i* have pendants *k* attached to them, which pendants, at certain points in the movement of the rack-block E, come in contact with uprights *l*, on the plate F, and actuate the inclined planes *i i*, as will be hereafter referred to.

On the swinging plate G, a last, H, is secured, on which the boot or shoe to be pegged is placed.

By this arrangement of parts, it will be seen that the block, or plates G, and the last H, which rests upon it, are free to vibrate vertically on the pivots *g*, which have their bearings in the uprights *h*, and that, consequently, the last may be made to so vibrate on the axis *g*, as to keep those portions of the surface of the boot or shoe, which are brought under the awl, at the same height, or in the same horizontal plane. And thus I compensate for the unevenness or undulations of the surface of the sole, and present it to the awl and pegging-devices, the same as though it were a perfectly smooth or plane surface.

It will, of course, be understood, that the projection *l* on plate D, and the pendants *k* on the blocks *j*, are so arranged, in relation to each other, and to the last H, as to cause the inclines *i* to move at the proper times to tip the last, so as to produce this result. For instance, when the ball-of-the-foot portion of the shoe is brought under the awl, the inclines *i* will be so moved as to lower the front end, and elevate the heel.

By these means, together with the adjustment of the parts *e* and *f* of the rack-block F, and the lateral swinging of the bed-plate D, I adapt my machine to the manufacture of boots and shoes of various sizes, and of different widths and lengths.

In the back part of the frame C, a shaft, I, is placed transversely. This is the driving, or power-shaft, and it communicates motion to the whole machine.

This shaft I has a pinion, *m*, at one end of it, and said pinion gears into a wheel, *n*, which is placed at the outer end of a shaft, J, which is also placed in the back part of the frame C, and parallel with the shaft I.

On the shaft I, a cam, *n′*, is placed, as in figs. 2 and 3, said cam acting against an arm, *o*, which is attached to the upper end of a vertical shaft, K, the lower shaft K' being provided with a similar arm, *p*, to which a pawl, *l*, is attached, said pawl engaging with a ratchet, L', which is on the axis of a pinion, *q*, that gears into the rack-block E. (See more particularly figs. 1, 3, and 6.)

To the inner side of the cam *r*, a projection, *r*, is attached, (see fig. 4;) and this projection works in a yoke, *s*, which is secured to the inner end of a sliding bar, *t*, in the frame C.

In the outer end of the bar *t*, two vertical plungers *u v* are placed, and allowed to work, or slide freely up and down therein.

To the upper end of each rod *u v*, a plate, *a'*, is pivoted, and on each plate *a'*, a hammer, M, is placed, or attached by a guide, *b'*, the upper end of each plate *a'* being notched, as shown at *b*×, figs. 1 and 3, so that the guide *b'* may catch against the shoulder formed by the notches, and raise the rods *u v*, after said hammers have reached a certain height.

The hammers M M are attached to the ends of bars N N, which are both placed loosely on a shaft, C', in the back part of the frame C, each shaft C having a pendant, *d'*, attached, against which pendent cams *e'*, on the shaft I, act.

To each bar N, a spring, *f*, is attached, said springs having a tendency to keep the hammers M down.

In the lower end of the plunger-rod *u*, an awl, *g*, is secured, and a rod, or punch, *h'*, is attached to the lower end of the plunger-rod *v*.

In the outer end of the sliding bar *t*, a vertical-sliding bar, O, is placed.

At the lower end of this bar O, a socket, *i'*, is attached.

This socket is simply a projection attached to the bar O, and having a vertical hole, *j'*, made in it, near one end, to receive the peg to be driven. (See fig. 2.)

A knife, or cutter, *k'*, is attached to the socket *i'*, adjoining the hole *j'*.

In the bar O, the front end of a lever, P, is fitted, said lever having its fulcrum-pin at *l'*, (see fig. 1,) and a yoke, Q, at its back end, in which yoke a cam, or projection, *m'*, on the shaft I, works.

To the under side of the frame C, a slide-bar, R, is placed, and fitted in guides *n'*.

To the back end of this bar, a yoke, *o'*, is attached, in which yoke a cam, *p'*, on the shaft J, works.

The yoke *o'* is attached to the slide-bar R, by a pivot, *q'*, as shown clearly in fig. 5, and the yoke has a lever, or shipper, *r'*, attached to it, for the purpose of throwing the yoke in and out of gear with the cam *p p'*, as may be desired.

The front end of the slide-bar R, has a shoulder, *s'*, formed on it, and the edge of the sole of the shoe is made to bear against this shoulder, in consequence of a spring, *t'*, which is connected with the plate F; and the front end of the bar R is made to bear on the shoe, by a spring, *u'*, which is attached to the frame C, as shown in fig. 1.

To the front part of the frame C, a feed-box, S, is attached, the outer end of said box being attached to a stationary arm, *v'*, by a pivot.

This feed-box is formed of two parallel troughs, in which the serrated wooden strips *a*× are placed, as shown in red, fig. 2.

A cap, or box, *w'*, is placed directly over the inner end of the feed-box S, said cap, or box being attached to a spring, *x'*, which is secured to the side of the frame C, (see fig. 2,) the spring keeping said cap against a gauge, *y'*, attached to the opposite side of frame C.

The inner surface of the gauge *y'* is bevelled, as shown clearly in fig. 2, so that its lower edge will be somewhat closer to the inner end of the feed-box, than the upper end, the outer part of the gauge being in line with, or directly opposite the inner end of the feed-box.

In the feed-box S, a slide, or follower, *z'*, is placed, said slide, or follower having a weight, *b*×, attached by a cord, *c*×, which feeds the peg-strip to the gauge *y'*.

The operation is as follows:

The boot or shoe U to be operated upon, is placed on the last H, and motion is given to the shaft I in any proper way.

The two hammers M M are operated by means of the cams *e' e'* and springs *f f*, which actuate the bars N N, and the sliding bar *t* moves horizontally back and forth, in consequence of the projection *r* working within the yoke *s*.

The edge of the shoe U bears against the shoulder *s'* of the slide-bar R, the spring *t* insuring such result; and the shaft K has a vibratory motion given it by the cam *u'* and *o'*, in connection with a spring, *o*×, which is attached to the pawl L, said shaft K actuating the pinion *q*, through the medium of ratchet L' and pawl L, and the pinion *q* moving the rack-block E, and, consequently, the shoe U, which is moved along by the side of the shoulders *s'*, the rack-block E being kept in proper position on the plate D, by the projections *d* fitting in groove *c*, and turned, or rotated, as the pinion *q* acts on each end of the rack-block.

As the plunger-rod *u* descends, it being struck by its hammer M, a peg-hole is made in the sole of the shoe, by the awl *g'*, and as said rod *u* rises, the other plunger-rod *v* moves forward directly over the hole made by the awl *g'*, and the socket *i*, being in the bar *t*, moves with said rod *v*, and the hole *j'* in said socket, which contains a peg, is brought directly over the hole in the sole of the shoe, and the rod *v* then descends, and its punch *h'* is forced down into the hole *j'* of the socket, and drives the peg into the hole. The slide-bar *t* then moves back, the shoe U simultaneously moving along a certain distance, until the rod *u* is made again to descend, to form a succeeding hole for the next peg.

The object, therefore, of the reciprocating movement of the bar *t*, will be seen, and it will also be seen that the hammers, in consequence of being connected to the plunger-rods *u v*, admit of a very compact arrangement of the peg-driving mechanism, as well as insuring a perfect unity of action, so far as the plunger-rods *u v* and hammers are concerned, the latter raising the plunger-rods, as well as forcing them down.

As the slide-bar *t* reaches the end of its backward movement, the socket *i* is raised by the lever P', and the knife K' splits a peg from the serrated strip of wood, *a*×, the peg passing into the hole *j'* of the socket.

The strip of wood *a*× is fed to the gauge *y'*, by the weight *b*× and follower *z'*, and as the face-side of the gauge is made inclined, its lower edge being nearer the feed-box S, than its upper end, it follows, as a matter of course, that the lower part of the peg-strip *a*× will be kept against said gauge, even when the upper part projects over the lower edge of the peg-strip—a contingency which frequently occurs, in consequence of the crooked grain of the wood. This inclined face-surface of the gauge *y'*, insures the gauging of the pegs from their points, and, consequently, the pegs will be fed regularly in the holes *j'* of the socket *i*.

As the operation of pegging progresses, the sole of the shoe U is always presented at right angles with the pegs to be driven, in consequence of the swinging of plate G, which is actuated, or inclined by the inclined planes *i i*, said planes being moved, at the proper time, by their pendants *k* coming in contact with the uprights *l* on plate D.

The machine is adapted to varying-sized shoes, by elongating or shortening the rack-block F, which is done by adjusting the part *f* of said block, the width of the shoes being compensated for by the swinging bed-plate D.

In case two rows of pegs are to be driven around the shoe, the yoke *o'* of the bar R is thrown in gear with the cam $p'$, and the bar R will, consequently, be moved back and forth a requisite distance, to allow two rows of pegs to be driven side by side, all around the sole, or at such parts as may be desired.

The feed-box S, as before stated, has two compartments, and one compartment may be provided with longer pegs than the other, so that long pegs may be driven in the sole at certain points, and short pegs at the other points, the box S being capable of adjustment, in consequence of working on a pivot at its outer end.

The swinging bed-plate D, it will be understood, admits of the shoe being moved in and out by the bar R, so that the two rows of pegs may be driven into the sole.

Having thus described my invention,

What I claim, is—

1. The rack-bar E, constructed of two parts, *e* and *f*, arranged substantially as described, so as to adjust it for boots or shoes of various sizes.

2. Pivoting the plate, or frame G, that supports the last, at or near its centre, and so arranging it, that it may turn on said pivot during the operation of pegging, thereby so adjusting the boot or shoe, as to present the various portions of the sole in the requisite position to the awl and peg, as the sole moves along, substantially as described.

3. The inclined planes *i*, or their equivalents, when arranged to operate, in combination with the hinged plate G, for adjusting the boot or shoe, substantially as set forth.

4. The inclined peg-gauge $y'$, in combination with the feed, or peg-box S, so as to gauge the pegs from their lower ends, as described.

5. The vibrating socket $e'$, in connection with the plunger-rods *u v*, arranged in the same slide-bar *t*, to operate as set forth.

6. The bar R, provided with the shoulder, or bearings $s'$, at its front end, and having the yoke $o'$ hinged to its rear end, and arranged to be operated by the cam $p'$, as and for the purpose set forth.

7. The combination of the swinging bed-plate D and rack E, arranged to operate as described.

ALPHEUS C. GALLAHUE.

Witnesses:
J. McKENNEY,
WM. A. McKENNEY.